US008374767B2

(12) United States Patent
Toedter et al.

(10) Patent No.: US 8,374,767 B2

(45) Date of Patent: Feb. 12, 2013

(54) METHOD FOR OPERATING A GLOW PLUG

(75) Inventors: Olaf Toedter, Walzbachtal (DE); Ulrich Stephan, Erligheim (DE)

(73) Assignee: BorgWarner BERU Systems GmbH, Ludwigsburg (DE)

(*) Notice: Subject to any disclaimer, the term of this patent is extended or adjusted under 35 U.S.C. 154(b) by 417 days.

(21) Appl. No.: 12/834,661

(22) Filed: Jul. 12, 2010

(65) Prior Publication Data

US 2011/0015848 A1 Jan. 20, 2011

(30) Foreign Application Priority Data

Jul. 14, 2009 (DE) ........................ 10 2009 032 959

(51) Int. Cl.
*F02P 5/14* (2006.01)
*G06F 19/00* (2011.01)

(52) U.S. Cl. ............... 701/101; 123/406.22; 123/406.58

(58) Field of Classification Search .................. 701/101, 701/102, 115; 123/406.12, 406.22, 406.58, 123/406.62, 145 R, 145 A
See application file for complete search history.

(56) References Cited

U.S. PATENT DOCUMENTS

| | | | | |
|---|---|---|---|---|
| 3,221,213 | A * | 11/1965 | Mckinney | 315/209 T |
| 4,869,221 | A * | 9/1989 | Abe | 123/406.62 |
| 6,227,157 | B1 | 5/2001 | Baumgartner et al. | |
| 6,804,997 | B1 * | 10/2004 | Schwulst | 73/114.37 |
| 2007/0089697 | A1 | 4/2007 | Hara et al. | |
| 2007/0289572 | A1 | 12/2007 | Petridis et al. | |

FOREIGN PATENT DOCUMENTS

| | | | |
|---|---|---|---|
| DE | 10 2005 026 074 | A1 | 12/2006 |
| DE | 10 2008 023 143 | A1 | 11/2009 |
| JP | 2009-203938 | | 9/2009 |

* cited by examiner

*Primary Examiner* — Hieu T Vo

(57) ABSTRACT

The invention relates to a method for operating a glow plug with running engine, with the engine having a crankshaft and at least one cylinder. An effective voltage is generated from a vehicle electrical system voltage, with the effective voltage being applied to the glow plug. A plurality of measurement values of the combustion chamber pressure prevalent in the cylinder is measured during each working cycle of the cylinder, with the angular position of the crankshaft being determined for each individual measurement value. A characteristic value of the combustion process is determined from the evolution of the combustion chamber pressure measured in relation to the angular position of the crankshaft, and the determined characteristic value is compared with a setpoint value, and the effective voltage is set to a minimum value required for reaching the setpoint value.

14 Claims, 1 Drawing Sheet

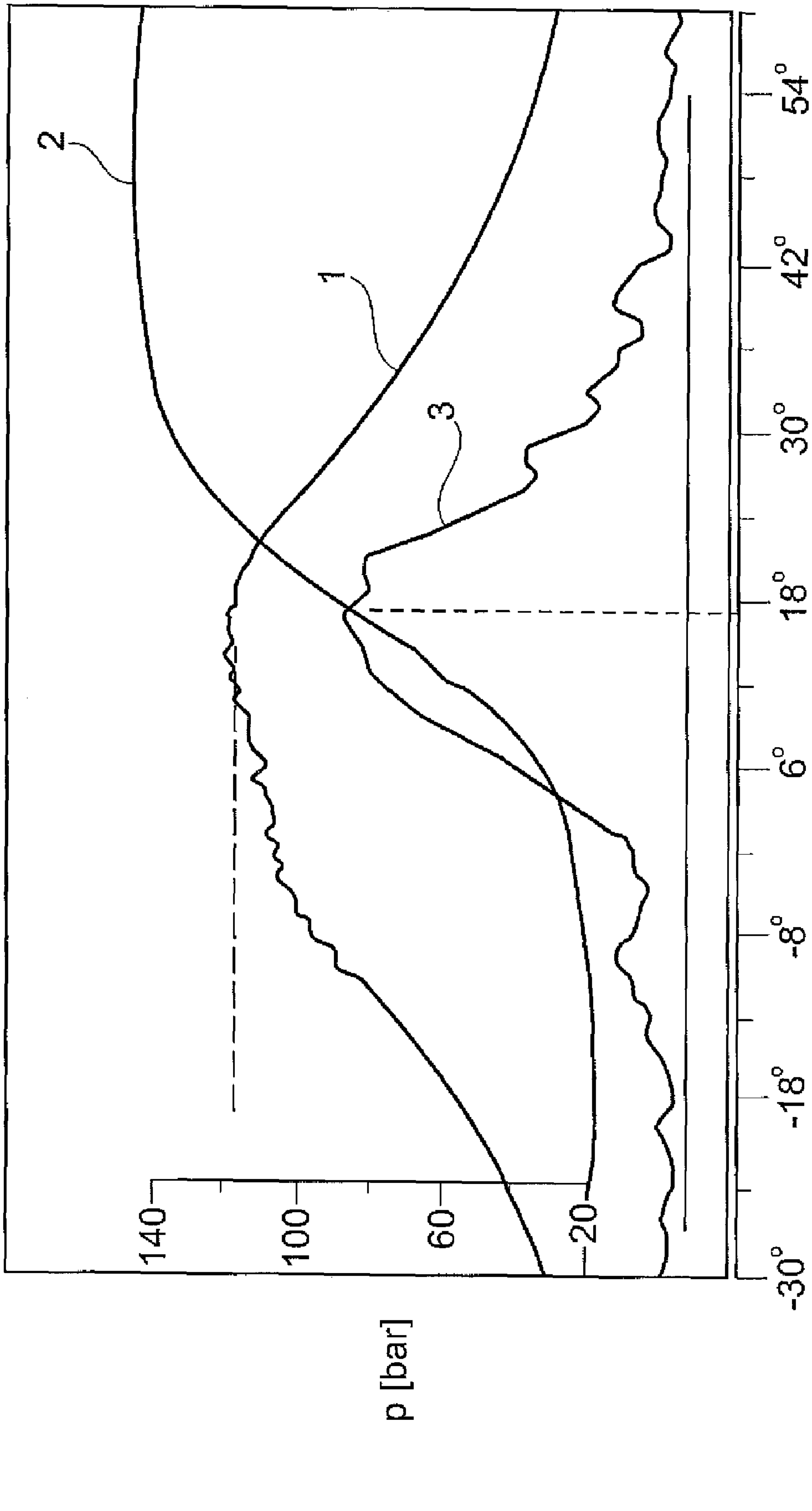
2
1
3
140
100
60
20
p [bar]
-30°
-18°
-8°
6°
18°
30°
42°
54°

METHOD FOR OPERATING A GLOW PLUG

The invention relates to a method for operating a glow plug with running engine, wherein an effective voltage is generated from a vehicle electrical system voltage, said effective voltage being applied to the glow plug.

For example, DE 10 2005 026 074 A1 discloses glow plugs for self-igniting internal combustion engines, said glow plugs comprising an integrated combustion chamber pressure sensor. Such pressure measuring glow plugs are used to measure the combustion chamber pressure in a continuous or quasi-continuous manner and to report said pressure to an engine control unit which regulates the injection of fuel while taking the combustion chamber pressure into consideration.

In this manner, modern engine control units allow achieving reduced fuel consumption and an increased service life of the engine. However, the integration of a combustion chamber pressure sensor increases the production costs of glow plugs. This is all the more significant, the shorter the service life of the glow plug. For this reason, an incessant aim in the development of glow plugs and glow plug control units is to reduce the production costs on the one hand and to increase the service life of glow plugs on the other hand.

It is an object of the present invention to show a way of saving costs in connection with motor vehicles with Diesel engines.

SUMMARY OF THE INVENTION

In a method according to the invention, a plurality of measurement values of the combustion chamber pressure prevalent in the cylinder is measured during each working cycle of the cylinder, with the angular position of the crankshaft being determined for each individual measurement value. A characteristic value of the combustion process is determined from the evolution of the combustion chamber pressure that is measured in relation to the angular position of the crankshaft, the determined characteristic value is compared with a setpoint value, and the effective voltage is set to a minimum value required for reaching the setpoint value. For example, a characteristic value that can be used for the combustion process is the angular position of the crankshaft at a maximum value of the combustion chamber pressure.

A method according to the invention can be used to prolong the service life of a glow plug to a significant extent without the quality of combustion being affected. The fact that, in a method according to the invention, the quality of combustion can be continuously monitored by evaluating the combustion chamber pressure measured in relation to the crankshaft angle allows reducing the temperature of the glow plug by reducing the effective voltage to the minimum value required for optimal combustion. Any possibly excessive reduction can be detected and corrected practically on the spot. In this manner, the thermal load of the glow plug can be minimized and the service life prolonged accordingly.

A minimum temperature of the glow plug is required to achieve optimal combustion of the fuel in a self-igniting engine, said minimum temperature being dependent on the condition of the engine. Whereas a temperature of the glow plug that is too low results in a considerable deterioration of the combustion behavior, exceeding of the minimum temperature does not have any effect on the quality of combustion or has a negligible effect only. That is why an operating temperature of the glow plugs that corresponds to the minimum temperature required in the most unfavorable case and, therefore, is unnecessarily high most of the time is set in known glow plug control units. By applying the method according to the invention, the plug temperature can be reduced to the minimum temperature required for optimal combustion in all operating conditions of the engine. In particular, glowing can be stopped practically on the spot if it is not required any longer.

The characteristic setpoint value of the combustion process can be predefined and, for example, be stored as an invariable constant in the memory of a glow plug control unit. But it is also, advantageously, possible to define the setpoint value in relation to the engine speed and/or in relation to the engine load. The characteristic setpoint value of the combustion process can be defined for the glow plug control unit by an engine control unit. However, it is also possible for the glow plug control unit to determine the setpoint value in relation to the engine speed by itself. This can be achieved without much ado because the glow plug control unit determines the angular position of the crankshaft for each of the individual measurement values of the combustion chamber pressure and, therefore, has the information available that is required for determining the speed. For example, the setpoint value can be determined from the engine speed and/or the engine load by means of a characteristic curve or a family of characteristics.

As has already been mentioned, the crankshaft angle at which the combustion chamber pressure reaches its maximum value can be used as the characteristic value of the combustion process. Since it cannot be avoided that individual measurement values are afflicted with measurement errors and, therefore, often show considerable fluctuation, the exact position of the maximum of the measurement values available can, in some cases, only be determined with considerable inaccuracy. To confront this problem, it is, for example, also possible to use the ratio between two integrals of the combustion chamber pressure across different angular ranges of the crankshaft as the characteristic value.

For example, the integral of the combustion chamber pressure from a first crankshaft angle, for example, at the beginning of the working cycle or the maximum pressure, to a second crankshaft angle, for example, the crankshaft angle at which an ignition of the fuel mixture should, ideally, take place, can be set in relation to a second integral which, preferably, directly follows the first integral. That is to say that, with such an approach, the characteristic value is determined from the combustion chamber pressure by calculating a first integral of the combustion chamber pressure between two defined crankshaft angles, calculating a second integral between two defined crankshaft angles, and calculating the characteristic value as the quotient from the two integrals. The upper integration limit of the first integral may correspond to the lower integration limit of the second integral, but this is not necessary. The beginning of the working cycle or any later value of the crankshaft angle desired can be used as the lower integration limit of the first integral. Accordingly, the end of the working cycle or a smaller value of the crankshaft angle can be used as the upper integration limit of the second integral.

It is not very complicated to calculate an integral of the combustion chamber pressure numerically, for example, by summation of the pressure measurement values present between the particular integration limits.

In general, the characteristic value of the combustion process can, for example, be calculated as the ratio between values of the combustion chamber pressure at defined values of the crankshaft angle or as the ratio of integrals of the combustion chamber pressure across defined angular ranges of the crankshaft. It is also possible to determine a characteristic value of the combustion process by differentiation of the evolution of the combustion chamber pressure. For example, a maximum of the first derivative of the combustion chamber pressure after the crankshaft angle can be used as the characteristic value.

Various variables characterizing combustion, for example, the heat release of the combustion, can be determined by evaluating the evolution of the combustion chamber pressure measured in relation to the angular position of the crankshaft. Usual variables for characterizing the heat release of combustion are, for example, AQ5, AQ50 or AQ90. Therein, each numerical value specifies the percentage of the heat release that has taken place before the particular crankshaft angle. In other words, the variable AQ50 is the crankshaft angle at which 50% of the heat transformation has taken place during a working cycle.

When an engine is started, it usually takes some time until a glow plug has reached its operating temperature and components of the engine in the vicinity of the glow plug have heated up to a degree where conditions are practically stable. In some cases, the heating behavior during start can better be achieved with a predefined heating routine than with the described method. For this reason, it may be advantageous to start the method according to the invention only after a defined time period, for example, 20 seconds or more, has elapsed after the engine was started, i.e. after the crankshaft started to turn. This time period can also be specified as a defined number of revolutions of the crankshaft, with the result that the method is, for example, started as soon as the crankshaft has performed at least 100 revolutions since the engine was started.

In addition, a method according to the invention can be to advantage in that the characteristic value can be regulated to a setpoint value and, therefore, combustion can be improved.

BRIEF DESCRIPTION OF THE DRAWINGS

Further details and advantages of the invention will be illustrated by means of an exemplary embodiment with reference being made to the accompanying drawing.

FIG. 1 shows the development of the combustion chamber pressure and some combustion-dependent variables in relation to the crankshaft angle by way of example.

DETAILED DESCRIPTION

To operate a glow plug with running engine, an effective voltage is generated from a vehicle electrical system voltage by pulse width modulation, said effective voltage being applied to the glow plug. The engine is a Diesel engine or any other self-igniting internal combustion engine. The engine has a crankshaft which is coupled to the pistons moving in the engine cylinders and converts the reciprocating motion thereof into a rotary motion. The engine has at least one cylinder, in the normal case 2, 4 or more cylinders.

The value of the effective voltage can be defined separately for each individual glow plug of the cylinders. To achieve this, a plurality of measurement values of the combustion chamber pressure prevalent in the cylinder is measured during each working cycle of the cylinder, with the angular position of the crankshaft being determined for each individual measurement value. Preferably, the glow plug used is a pressure measuring glow plug which measures the combustion chamber pressure with an integrated sensor and can, therefore, provide measurement values of the combustion chamber pressure to a glow plug control unit. A suitable pressure measuring glow plug is, for example, known from DE 10 2005 026 074 A1.

Preferably, the combustion chamber pressure is measured in a continuous or quasi-continuous manner, with the result that the measurement values follow each other closely in terms of time. Preferably at least 20, more preferably at least 50, and most preferably at least 100 measurement values of the combustion chamber pressure are measured during one working cycle. In order to determine the angular position of the crankshaft for each individual measurement value, it is sufficient to report the current angular position to the glow plug control unit at least once per cycle. For example, it is sufficient to report each zero passage of the crankshaft to the glow plug control unit, i.e. to notify the glow plug control unit whenever the angular position of the crankshaft is 0° or has reached any other defined value. By simple time measurement, a glow plug control unit can then allocate values of the crankshaft angle to the measurement values of the combustion chamber pressure, said measurement values having been determined between two such signals of a crankshaft sensor.

In FIG. 1, curve 1 indicates the development of the combustion chamber pressure (in bar) in relation to the crankshaft angle (in degrees). The evolution of the combustion chamber pressure is used to determine a characteristic value of the combustion process. For example, the angular position of the crankshaft at which the combustion chamber pressure has reached its maximum during the working cycle can be used as the characteristic value of the combustion process. In the example shown, the combustion chamber pressure reaches its maximum value at a crankshaft angle of approximately 17.5°.

The determined characteristic value is compared with a setpoint value, and the effective voltage is set to a minimum value required for reaching the setpoint value. If the determined characteristic value corresponds to the defined setpoint value, the effective voltage is lowered. If, during a later working cycle, it is detected that the effective voltage was lowered too far and the characteristic value, therefore, is now different from the setpoint value, the effective voltage is increased. In this manner, the effective voltage can be set to a minimum value required for reaching the setpoint value.

For example, the effective voltage can be lowered if the combustion chamber pressure reaches its maximum value at a crankshaft angle which is less than or equal to a setpoint value, and the effective voltage can be increased if the combustion chamber pressure reaches its maximum value at a crankshaft angle which is greater than the setpoint value.

It is appropriate to lower the effective voltage in small increments if it is detected that the determined characteristic value corresponds to the setpoint value. Preferably, the effective voltage is changed in increments which are less than 5%, more preferably less than 2%, and most preferably less than 1% of the vehicle electrical system voltage. The effective voltage is reduced by shortening the duration of the voltage pulses in relation to the pauses present therebetween.

In order to increase the stability of the method, it may be advantageous not to change the effective voltage during each working cycle but to compare the determined characteristic value with the setpoint value or to lower the effective voltage only if there is agreement after a defined number of working cycles, for example, after 3 or more, for instance, after 5 working cycles. Therein, each currently determined value can be compared with the setpoint value, or the values determined for a defined number of preceding cycles can be subjected to statistical evaluation. For example, the statistical average of the determined characteristic values can be compared with a setpoint value.

The setpoint value can be specified to a glow plug control unit by an engine control unit in relation to the engine speed and the engine load.

For example, the portion of the fuel already combusted can be calculated from the development of the combustion chamber pressure 1. In FIG. 1, curve 2 indicates the portion of the fuel already combusted in the working cycle, i.e. the degree of energy conversion. The portion is 0 at the beginning of the working cycle because fuel has not been combusted yet. The portion is 1 at the end of the working cycle because the fuel has then been combusted completely. For this reason, curve 2 and/or its value at a given crankshaft angle can also be used as the characteristic value of combustion.

In FIG. 1, the heat release is additionally plotted as curve 3 in arbitrary units. In FIG. 1, the maximum of heat dissipation coincides with the maximum pressure value. At the corresponding crankshaft angle, half of the fuel has been combusted.

What is claimed is:

1. Method for operating a glow plug with running engine, wherein the engine comprises a crankshaft and at least one cylinder, said method comprising:

generating an effective voltage from a vehicle electrical system voltage, said effective voltage being applied to the glow plug, measuring a plurality of values of the combustion chamber pressure prevalent in the cylinder during each working cycle of the cylinder, with the angular position of the crankshaft being determined for each individual measurement value, determining a characteristic value of the combustion process from the evolution of the combustion chamber pressure measured in relation to the angular position of the crankshaft, comparing characteristic value with a setpoint value; and setting the effective voltage to a minimum value required for reaching the setpoint value.

2. Method according to claim 1, wherein the setpoint value is defined as a function of the engine speed.

3. Method according to claim 1, wherein the setpoint value is defined as a function of the engine load.

4. Method according to claim 1, wherein the characteristic value is the angular position of the crankshaft at a maximum value of the combustion chamber pressure.

5. Method according to claim 4, wherein the effective voltage is lowered if the combustion chamber pressure reaches its maximum value at a crankshaft angle that is less than a setpoint value, and the effective voltage is increased if the combustion chamber pressure reaches its maximum value at a crankshaft angle that is greater than the setpoint value.

6. Method according to claim 1, wherein the characteristic value is determined from the combustion chamber pressure by calculating a first integral of the combustion chamber pressure between two defined crankshaft angles, and a second integral is calculated between two defined crankshaft angles, and calculating the characteristic value as the quotient from the two integrals.

7. Method according claim 1, wherein the effective voltage is lowered if it is detected that the determined characteristic value is in accordance with the setpoint value.

8. Method according to claim 1, wherein in order to be set to the minimum value required to reach the setpoint value, the effective voltage is lowered by no more than 5%, preferably by less than 2%, and most preferably by less than 1% during a working cycle.

9. Method according to claim 1, wherein the characteristic value is optimized to a setpoint value by closed loop control.

10. Method according to claim 1, wherein the effective voltage is generated by a pulse width modulation method.

11. Method according to claim 1, wherein the method is started only if a defined time period has elapsed since the engine was started.

12. Method according to claim 1, wherein the characteristic value of the combustion process is the time of ignition.

13. Method according to claim 1, wherein the determined characteristic value is compared with a setpoint value by an engine control unit.

14. Method according to claim 13, wherein a result of the comparison is reported to a glow plug control unit which changes the effective voltage in relation to the result of the comparison in order to set the effective voltage to a minimum value required for reaching the setpoint value.

* * * * *